(12) United States Patent
Kikuchi

(10) Patent No.: US 7,733,029 B2
(45) Date of Patent: Jun. 8, 2010

(54) LIGHTING DEVICE AND A LIGHTING METHOD FOR A HIGH PRESSURE DISCHARGE LAMP

(75) Inventor: Seiji Kikuchi, Gyoda (JP)

(73) Assignee: Iwasaki Electric Co., Ltd., Tokyo (JP)

( * ) Notice: Subject to any disclaimer, the term of this patent is extended or adjusted under 35 U.S.C. 154(b) by 682 days.

(21) Appl. No.: 10/597,547

(22) PCT Filed: Jan. 28, 2005

(86) PCT No.: PCT/JP2005/001197

§ 371 (c)(1),
(2), (4) Date: Nov. 3, 2006

(87) PCT Pub. No.: WO2005/074332

PCT Pub. Date: Aug. 11, 2005

(65) Prior Publication Data

US 2008/0246410 A1    Oct. 9, 2008

(30) Foreign Application Priority Data

Feb. 2, 2004   (JP) .............................. 2004-026025
Feb. 17, 2004  (JP) .............................. 2004-039286

(51) Int. Cl.
  *H05B 39/04*   (2006.01)
(52) U.S. Cl. ....................... 315/194; 315/137
(58) Field of Classification Search ................. 315/246, 315/137, 160, 194, 200 R, 291, 326, 341, 315/349–352, 356, 360
See application file for complete search history.

(56) References Cited

FOREIGN PATENT DOCUMENTS

| JP | 2001-244088 | 9/2001 |
|---|---|---|
| JP | 2003-059684 | 2/2003 |
| JP | 2003-178896 | 6/2003 |
| JP | 2003-197386 | 7/2003 |
| JP | 2004-039563 | 2/2004 |
| JP | 2004-342465 | 12/2004 |

OTHER PUBLICATIONS

English Language Abstract of JP 2003-059684.
English Language Abstract of JP 2003-197386.
English Language Abstract of JP 2001-244088.
English Language Abstract of JP 2003-178896.
English Language Abstract of JP 2004-039563.
English Language Abstract of JP 2004-342465.

*Primary Examiner*—Douglas W Owens
*Assistant Examiner*—Jianzi Chen
(74) *Attorney, Agent, or Firm*—Greenblum & Bernstein P.L.C.

(57) ABSTRACT

Even in a high pressure discharge lamp causing temperature difference between electrodes when an AC current is supplied, the temperature difference is eliminated to suppress the arc movement, thereby suppressing flickering caused thereby during stable lighting.

The lamp current is formed into a current waveform including a standard period current supplied at a predetermined standard period and a short period current of a period shorter than the same and, on every one-half period of the standard period current, formed into a current waveform by supplying the short period current inverting the polarity from the identical polarity to the opposite polarity in the next one-half period for 1 period, in which the duty ratio before and after the polarity inversion of the short period current and the duty ratio before and after the polarity inversion side can be decided automatically by the duty ratio.

8 Claims, 13 Drawing Sheets

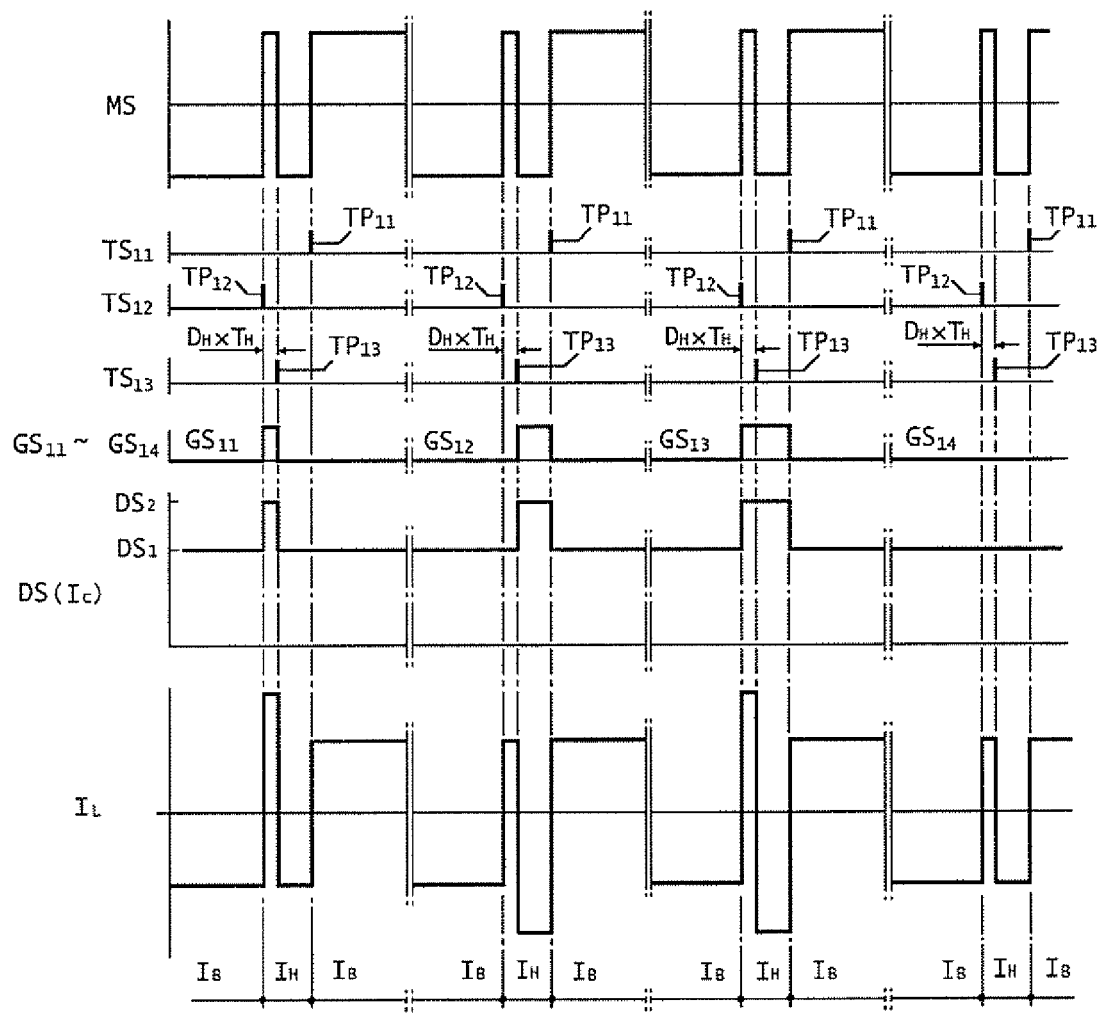

LIGHTING DEVICE AND A LIGHTING METHOD FOR A HIGH PRESSURE DISCHARGE LAMP

TECHNICAL FIELD

The present invention concerns a lighting device and a lighting method for a high pressure discharge lamp by supplying an AC lamp current to light up a high pressure discharge lamp.

BACKGROUND ART

A high pressure discharge lamp lighting device for use in a light source device for back light, for example, of a liquid crystal projector is adapted to light up the lamp by converting a current supplied from a DC power source to a rectangular current at a predetermined lighting frequency thereby switching the lighting polarity of the high pressure discharge lamp.

FIG. 13 shows an existent lighting device 31 for a high pressure discharge lamp in which a DC power outputted from a DC power source 2 is inputted to a chopper circuit 3 and a control circuit $I_C$ converted into an appropriate DC current by controlling the duty ratio of a switching device 4 by a PWM control circuit 32 is inputted to a full-bridge circuit 5.

In the full-bridge circuit 5, paired transistors $TR_1$, $TR_1$, and $Tr_2$, $TR_2$ are alternately conducted by a full-bridge control circuit 33 at a frequency, for example, of about 100 Hz to form a lamp current $I_L$ comprising a low frequency rectangular wave form relative to a high pressure discharge lamp L started by an ignitor circuit 6 thereby lighting up the high pressure discharge lamp L.

By the way, a super-high pressure mercury lamp has been used in recent years instead of a high pressure mercury lamp as a light source such as for a liquid crystal projector.

Since the super-high pressure mercury lamp has an extremely high vapor pressure during lighting (about $10^6$ Pa or higher), arc discharge is concentrated to the center of the discharge tube and both brightness and temperature are high, it has a merit of forming continuous spectrum, having color of light approximate to white, favorable color rendition and high emission efficiency.

However, in the existent high pressure discharge lamp lighting device of lighting only by the low frequency rectangular wave, since arc means can not be controlled in a super-high pressure mercury lamp, the amount of light entering the light receiving portion changes greatly by the arc movement and, when used to a liquid crystal projector, it causes a problem that the change of the screen illuminance increases to result in flickering on the screen.

Particularly, along with reduction in the size and the weight of liquid crystal projectors, reduction in the size and increase in the illuminance have been progressed for the reflection mirror of the light source and the size of the liquid crystal device as the photoreceiving portion is also reduced correspondingly, so that this results in a significant effect of flickering on the even for an identical amount of arc movement.

Flickering in a high pressure discharge lamp is formed due to the movement of the arc spot as a trigger point from which electrons are emitted when an arc directing from a cathode to an anode is generated.

Generally, in a case where the electrode temperature is uniform, a position for the nearest inter-electrode distance (protrusion formed at the top end of the electrode, etc.) constitutes an arc spot and, in a case where the distance is constant as in a parallel plate electrode, a position for the highest temperature constitutes the arc spot.

Accordingly, in a case of intending to control the arc spot, it may be considered that flickering can be suppressed by forming a high temperature portion locally on the electrode to fix the arc spot in a state where there is no temperature difference between the electrodes.

As a countermeasure, the present applicant has proposed a lighting device for a high pressure discharge lamp by supplying an AC lamp current upon lighting up a high pressure discharge lamp, of supplying a rectangular short period current at a frequency higher than that of a rectangular standard period current at a predetermined lighting frequency for one period instead of the standard period current, on every polarity inversion of the standard period current, and supplying a lamp current with the current value for the short period current higher than the standard period current. When a high pressure discharge lamp was lit up by the device, the arc spot is fixed and flickering on the screen could be suppressed.

[Patent Document 1] JP-A No. 2001-244088

That is, in a case of lighting a high pressure discharge lamp by AC, it is lit with opposing two electrodes being switched to a cathode and an anode alternately, and electrons projecting out of the cathode collide against the anode to generate discharge and the temperature of the anode hit by the electrons increases higher than that of the cathode.

Accordingly in a case of supplying the lamp current as described above, since an AC current is supplied under the identical condition between the electrodes and each of the electrodes is switched between the cathode and the anode in the same manner, temperature on each of the electrodes rises in the same manner, the temperature difference is not caused and, in addition, a high temperature portion is formed locally on the electrode to fix the arc spot.

However, high pressure discharge lamps or super-high pressure discharge lamps having a function of adding high value such as a light control function and an optional power fluctuation change have been manufactured recently, and it has been found that flickering can not be controlled effectively in such high pressure discharge lamps even when the lamp current as described above is supplied.

It is considered that a temperature difference is caused between the electrodes due to the structure of the electrode, the structure of the discharge lamp, effects caused by the reflection mirror, position for accessory equipments, and heat capacity or heat conduction property of them even when an AC current under identical condition is supplied between the electrodes.

As a result, the arc spot is not fixed tending to cause flickering, as well as a difference is caused to the amount of deformation due to deposition of metal vapors to the electrode surface or the abrasion of the electrode to result in the difference for the distance between the electrodes, thereby resulting in a problem that the control for the arc spot is made more difficult in a case of AC lighting.

In view of the above, the present inventor has made various experiments and, as a result, found that the electrode temperature can be kept constant by controlling the lamp current and, thus, the flickering can be moderated.

That is, in a case where the temperature difference is caused between the electrodes when a current is supplied under the same conditions between the electrodes, it has been found that a lamp current may be supplied to an electrode on a lower temperature such that the electrode functions as the anode for longer time and further that different optimal values are present for the ratio of time depending on the type of the high pressure discharge lamp respectively and the optimal values are equal so long as the type of high pressure discharge lamps is identical.

Further, it has been found that the flickering can be suppressed more effectively depending on the type of the high pressure discharge lamp by setting the ratio of time to an optimal value and using a ramp wave of gradually increasing or decreasing the current value before and/or after the polarity inversion of the short period current.

DISCLOSURE OF THE INVENTION

Subject to be Solved by the Invention

In view of the above, the present invention has been achieved based on the finding of the inventor as described above and it is a technical subject to enable effective suppression for flickering caused by the temperature difference even in a high pressure discharge lamp where a temperature difference is caused between the electrodes when an AC current is supplied.

Means for Solving the Subject

For solving the subject, the invention according to claim 1 provides a high pressure discharge lamp lighting device of supplying an AC lamp current to light up a high pressure discharge lamp, characterized by providing a lamp current forming device of forming the lamp current to a current waveform comprising a standard period current supplied at a predetermined standard period and a short period current of a period shorter than that described above in which, on every one-half period of the standard period current, a short period current that inverts the polarity from an identical polarity to an opposite polarity of the next one-half period is supplied for 1-period, and optionally setting a duty ratio before and after the polarity inversion of the short period current.

Further, the invention according to claim 2 is characterized by a lamp current forming device of forming a lamp current to a waveform where a standard period current supplied at a predetermined standard period and a short period current of a period shorter than that described above are alternately replaced with each other on every 1 period, and optionally setting a duty ratio before and after the polarity inversion for the standard frequency current and/or the short frequency current.

Effect of the Invention

According to the invention of the present application, since the duty ratio before and after polarity inversion of the short period current and the standard period current supplied as the lamp current can be set optionally, by setting the duty ratio such that the electrode at the lower temperature operates as the anode for a longer time, the temperature for each of the electrodes can be made substantially equal by rising the electrode temperature at the lower temperature thereby capable of eliminating the movement of arc spot due to temperature difference and suppressing flickering.

In this case, by using a high pressure discharge lamp of a type identical with the high pressure discharge lamp to be lit and previously measuring an optimal value of minimizing the flickering for the ratio of the time at which the electrode operates as an anode and as a cathode, since the duty ratio of the lamp current can be set in accordance with the optimal value, flickering can be suppressed effectively by one type of a lighting device for any high pressure discharge lamp without designing the lighting device on every type of the high pressure discharge lamps.

Further, as described in claim 3, since it can be formed as a ramp wave of gradually increasing or decreasing the current value before and/or after the polarity inversion of the short period current, this can be used also for a high pressure discharge lamp capable of suppressing flickering more effectively by the use of the ramp way.

Further, in a case where the current value before and/or after the polarity inversion of the short period current is set higher than the current value of the standard period current as described in claim 4 and, particularly, in a case where the current value of the short period current is set to 1.2 times or more and 5 times or less the current value of the standard period current, since this is most effective for warming the arc spot portion of the electrode, the arc spot becomes less moving and flickering can be prevented more effectively.

As described in claim 6, in a case where the period of the standard period current is set to $1/60$ sec or more, flickering by blinking upon polarity inversion is no more visible and, in a case where it is $1/500$ sec or less, the acoustic resonance phenomenon does not occur.

Further, in a case where the period of the short period current set to $1/4$ times or more the standard period, since the load on the electrode does not increase so much even in a case of setting current value thereof to higher than the standard period current, this does not result in a problem of violent abrasion of the electrode.

Further, by setting the period to $1/30$ times or less of the standard period, it is possible to efficiently warm the arc spot portion of the electrode and prevent flickering due to the movement of the arc spot.

BEST MODE FOR CARRYING OUT THE INVENTION

In this embodiment, the subject of eliminating the temperature difference to suppress the arc movement and flickering caused thereby during stable lighting even for a high pressure discharge lamp in which the temperature difference is caused between electrodes upon supply of AC current has been attained by improving the lamp current waveform.

The present invention is to be described based on embodiments shown in the drawings.

FIG. 1 is an explanatory view showing a lamp current generated by a lighting device according to the invention, FIG. 2 is a block diagram showing a lighting device according to the invention, FIG. 3 is an explanatory view showing each of signal wave forms, FIG. 4 is an explanatory view showing the process for forming the lamp current, FIG. 5 to FIG. 7 are explanatory views showing other lamp currents, FIG. 8 is an explanatory view showing a lamp current generated by another lighting device of the invention, FIG. 9 is a block diagram showing another lighting device according to the invention, FIG. 10 is an explanatory view showing the procedure of forming a synthesis wave, FIG. 11 is an explanatory view showing the procedure of forming a lamp current, and FIG. 12 is an explanatory view showing another example of the lamp current.

Embodiment 1

FIG. 1 shows waveforms of a lamp current $I_L$, a standard period circuit $I_B$, and a short period current $I_H$ supplied to a high pressure discharge lamp.

Then, the lamp current $I_L$ comprises a standard period current $I_B$ having a period of $1/500$ sec or more and $1/60$ sec or less supplied at a predetermined standard period, and a short period current $I_H$ having a period set to $1/30$ times or more and ¼ times or less thereof. On every start of the one-half period HC upon inversion of the polarity for the standard period current $I_B$, a short period current $I_H$ inverted for the polarity from an identical polarity to an opposite polarity is supplied for one period instead of the standard period current $I_B$.

The lighting period of the standard period current $I_B$ is set to 1/500 sec or more and 1/60 sec or less, because blinking caused upon polarity inversion becomes visible to result in flickering in a case where it exceeds 1/60 sec, and acoustic resonance phenomenon occurs when it is less than 1/50.

Further, the period for the short period current $I_H$ is set to 1/30 or more and ¼ times or less the standard period current $I_B$ because excess load an exerts on the electrode to cause a problem of violent abrasion of the electrode in a case where the current value is set higher than standard period current $I_B$, whereas the arc spot portion of the electrode can no more be heated and the arc spot moves to cause flickering in a case where it is less than 1/30 times.

The short period current $I_H$ is outputted with the duty ratio: $DR=d_1/(d_1+d_2)$ being controlled to a predetermined optional value in accordance with a high pressure discharge lamp before and after the polarity inversion.

Since the optimal duty ratio capable of preventing the flickering is different on every type of the high pressure discharge lamps, by setting to the duty ratio determined previously by an experiment, it can be coped with only one type of the lighting device can cope with them, without designing the lighting device on every type of the lamps Further, the current value of the one-half period before and/or after the polarity inversion of the short period current $I_H$ is set higher than the current value of the standard period current $I_B$, and the current values for both of them are set to 1.2 times or higher and 5 times or lower the current value of the standard period current $I_B$ in this embodiment.

The current value is set to 1.2 times or more and 5 times or less in order for most effectively heating arc spot portion of the electrode, thereby making the arc spot less moving, by which the flickering can be prevented effectively.

Further, the short period current $I_H$ may either be a rectangular waveform with the current value being constant before and after the polarity invention or a ramp waveform with the current value being gradually increased or decreased before and after the polarity inversion.

A high pressure discharge lamp lighting device 1 is adapted to supply a lamp current $I_L$ shown in FIG. 1 to light up a high pressure discharge lamp L, in which a power outputted from a DC power source 2 is inputted to a chopper circuit 3 and converted into an appropriate current by control for the duty ratio by the switching device 4 and then inputted into a full-bridge circuit 5.

The full-bridge circuit 5 is adapted to conduct paired transistors $TR_1$, $TR_1$, and $TR_2$, $TR_2$ alternately to the high pressure discharge lamp L started by a ignitor circuit 6 to invert the DC power at a predetermined timing to generate an AC lamp current $I_L$.

The chopper circuit 3 and the full-bridge circuit 5 are connected with a lamp current forming device 11 for supplying a short period current $I_H$ that inverts polarity from an identical polarity to an opposite polarity for 1 period instead of the standard period current $I_B$ on every start of one-half period HC upon inversion of the polarity of the standard period current $I_B$ of a predetermined period.

The lamp current forming device 11 comprises an analog circuit or a microcomputer having a standard period signal outputting device 12 generating a standard period signal $S_B$ with a period identical with the standard period current $I_B$, a short period signal outputting device 13 for forming a short period signal $S_H$ with a period identical with the short period current $I_H$, and a synthesizer 14 for synthesizing them to form a synthesis signal MS that inverts polarity at a timing equal with the lamp current $I_L$, and also having a clock pulse oscillator 15 for outputting a clock pulse CP for synchronizing the respective timings.

Then, the lamp current forming device 11 is connected with a full-bridge control circuit 16 for outputting a switch signal of alternately conducting paired transistors $TR_1$, $TR_1$, and $TR_2$, $TR_2$ of the full-bridge circuit 5 based on the polarity inversion timing of the synthesis signal MS outputted from the synthesizer 14, and a PWM control circuit 17 of PWM-controlling the switching device 4 of the chopper circuit 3 thereby controlling the current value of the lamp current $I_L$ and the waveform of the short period current $I_H$.

Now, referring to FIG. 3, the lamp current forming device 11 is to be described specifically.

The standard period signal outputting device 12 has a standard period setter 18 of setting the standard period within a range of 1/500 sec or more and 1/50 sec or less, thereby outputting a timing signal $TS_1$ synchronized with the clock pulse CP in accordance with the period on every one-half period and a standard period signal generator 19 for generating a standard period signal $S_B$ inverting the polarity in synchronization with the timing signal $TS_1$ thereof.

The short period signal outputting device 13 has a short period setter 20 of outputting a timing signal $TS_2$ in synchronization with the clock pulse CP on every one period in accordance with the period, a duty ratio setter 21 for setting a duty ratio DR before and/or after polarity inversion in 1 period thereby outputting a timing signal $TS_3$ for polarity inversion in synchronization with the clock pulse CP in accordance with the duty ratio DR thereof, and a short period signal generator 22 generating a short period signal $S_H$ at a predetermined period (frequency) and a predetermined duty ratio DR in accordance with each of the timing signals $TS_2$ and $TS_3$.

The standard period signal $S_B$ and the short period signal $S_H$ generated in the standard period outputting device 12 and the short period signal outputting device 13, and timing signals $TS_1$ and $TS_2$ generated by the lighting frequency setter 18 and the high frequency setter 20 are inputted to the synthesizer 14.

Then, the reference signal $S_B$ is allowed to passed and the short period signal $S_H$ is interrupted till the timing signal $TS_1$ in accordance with the standard period is inputted.

Further, from the input of the timing signal $TS_1$ till the input of the next timing signal $TS_2$, the standard period signal $S_B$ is interrupted and the short period signal $S_H$ is conducted for 1 period. In this case, where the standard period signal $S_B$ is positive by polarity inversion, the short period signal $S_H$ is conducted as it is and, where it is negative by polarity inversion, the short period signal $S_H$ is conducted while changing the positive and negative signs thereof.

Thus, a synthesis signal of normally outputting the standard period signal $S_B$ and, on every start of one-half period upon polarity inversion of the standard period signal $S_B$, and MS supplying the short period signal $S_H$ that inverts the polarity from the identical polarity to the opposite polarity for 1 period instead of the standard period current $S_B$ is outputted.

Then, the full-bridge control circuit 16 outputs a switch signal for alternatively conducting the paired transistors $TR_1$, $TR_1$ and $Tr_2$, $TR_2$ of the full-bridge circuit 5 based on the polarity inversion timing of the synthesis signal MS thereby the polarity of the lamp current $I_L$ is inverted in synchronization with the synthesis signal MS.

Further, the synthesizer 14 is connected to the PWM control circuit 17 by way of a current controller 23 for setting the current values of the standard period current $I_B$ and the short period current $I_H$.

The current adjuster 23 has a standard current setter 24 for normally outputting a normal current setting signal in accordance with the current value for the standard period current $I_B$ of the lamp current $I_L$, and an overcurrent setter 25 for outputting an overcurrent setting signal in accordance with the current value of the short period current $I_H$ set to 1.2 times or more and 5 times or less the standard period current $I_B$.

Further, it has a gate 26 for supplying, to the PWM control circuit 17, a current setting signal DS, that is, selectively passed normal current setting signal $DS_1$ or overcurrent setting signal $DS_2$, outputted from each of the setters 24 and 25, and a gate controller 27 for controlling the gate 26.

The gate controller 27 outputs gate signals $GS_1$-$GS_3$ of increasing the current value before and/or after the polarity inversion of the short period current $I_H$ based on the timing signal $TS_1$ in synchronization with the one-half period of the standard period signal $S_B$ and timing signals $TS_2$ and the $TS_3$ in synchronization with the one period of the short period signal and the polarity inversion.

In a case of increasing the current value only before the polarity inversion, a gate signal $GS_1$ kept at a high level only from the input of the timing signal $TS_1$ to the input of the next timing signal $TS_3$ is outputted.

Further, in a case of increasing the current value only after the polarity inversion, a gate signal $GS_2$ kept at a high level only from the input of the timing signal $TS_3$ to the input of the next timing signal $TS_2$ after the input of the timing signal $TS_1$.

In a case of increasing the current value both before and after the polarity conversion, that is, for 1 period, a gate signal $GS_3$ is outputted at a high level only after the input of the timing signal $TS_1$ to the input of the next timing signal $TS_2$.

In any of the cases, during keeping of each of the gate signals $GS_1$ to $GS_3$ at a low level, the normal current setting signal $DS_1$ outputted from the standard current setter 24 is passed through the gate 26 and supplied to the PWM control circuit 17 by which the switching device 4 is turned on and off at a low duty ratio by the chopper signal CS outputted from the PWM control circuit 17.

Further, during keeping at a high level, an overcurrent setting signal $DS_2$ outputted from the overcurrent setter 25 is passed through the gate 26 and supplied to the PWM control circuit 17, by which the switching device 4 is turned on and off at a high duty ratio by the chopper signal CS outputted from the PWM control circuit 17.

That is, the current setting signal DS supplied to the PWM control circuit 17 comprises a normal current setting signal $DS_1$ at a standard level and an overcurrent setting signal $DS_2$ at a high level and since the duty ratio of the chopper signal CS changes in accordance with the level, the current value of the short period current $I_H$ for a portion synchronizing before and/or after the polarity inversion of the short period current $I_H$ can be set to 1.2 times or more and 5 times or less the standard period current $I_B$.

Further, the overcurrent setter 25 is connected with a waveform setter 28 for gradually increasing or decreasing the current value to form a ramp wave at least before and/or after the polarity inversion of the short period current $I_H$.

The waveform setter 28 outputs a control signal for gradually increasing or decreasing the current setting signal $DS_2$ outputted from the overcurrent setter 25 before and after the polarity inversion of the short period current $I_H$ respectively.

Since the current value of the lamp current $I_1$ is in proportion with the duty ratio of the chopper signal CS and the duty ratio depends on the level of the current setting signal DS, the short period current $I_H$ can be formed as a ramp wave by changing the level with time (refer to FIG. 7).

A constitutional example of the invention is as has been described above and the operation thereof is to be described.

At first, for the duty ratio DR of the short period current $I_H$ before and after the polarity inversion, an optimal value capable of suppressing flickering is determined by previously conducting an experiment for a discharge lamp of a type identical with that of a high pressure discharge lamp L to be lit.

Further, also for the waveform of a short period signal $I_H$ before and after polarity inversion, an experiment is previously conducted on a discharge lamp of a type identical with the high pressure discharge lamp L to be lit and it is decided as to the optimal waveform capable of suppressing the flickering, whether it should be a ramp wave of gradually increasing or decreasing the current value before and/or after the polarity inversion.

Then, for forming the lamp current $I_L$ to be outputted, when the lighting frequency, the period (frequency of the short period current $I_H$, and the duty ratio DR are set in accordance with the high voltage discharge lamp to be used, the timing signals $TS_1$ to $TS_3$ are outputted from the lighting frequency setter 18, the short period setter 20, and the duty ratio setter 21 and, based thereon, the standard period signal $S_B$ and the short period signal $S_H$ are outputted from the standard period signal outputting device 12 and the short period signal outputting device 13 to the synthesizer 14, and the synthesis signal M is outputted from the synthesizer 14 to the full-bridge control circuit 16 (refer to FIG. 3).

Then, in a case of setting the current value higher only after the polarity inversion for the portion of the short period current $I_H$ of the lamp current $I_L$, a gate signal $GS_2$ kept at a high level only after the input of the first timing signal $TS_3$ to the input of the next timing signal $TS_2$ after the input of the timing signal $TS_1$ from the gate controller 27 is outputted.

Then, as shown in FIG. 4, the current setting signal DS outputted from the current controller 23 to the PWM control circuit 17 is outputted as a standard current setting signal $DS_1$ when the gate signal $GS_2$ is at a low level and as an overcurrent setting signal $DS_2$ when it is at a high level.

In this case, the DC power DW outputted from the DC power source 2 of the discharge lamp lighting device 1 is controlled to a current in accordance with the standard period current $I_B$ at the low level of the current setting signal DS, and controlled to a current in accordance with the short period current $I_H$ at the high level by the device 4 controlled for the duty ratio by the chopper signal CS, and the control current $I_0$ is outputted from the chopper circuit 3 to the full-ridge circuit 5.

In the full-ridge circuit 5, paired transistors $TR_1$, $TR_1$ and $TR_2$, $TR_2$ are conducted alternately in synchronization with the timing of polarity inversion of the synthesis signal MS by the switch signal outputted from the full-bridge control circuit 16.

Accordingly, since a lamp current $I_L$ inverted for the polarity in synchronization with the synthesis signal MS is outputted from the full-ridge circuit 5, and the overcurrent portion of the control current $I_0$ is in synchronization with the portion of the short period signal $S_H$ of the synthesis signal MS after the polarity inversion, an overcurrent for the lamp current $I_L$ flows only after the polarity inversion of the short period current $I_H$.

Then, when the high pressure discharge lamp L is lit by the thus outputted lamp current $I_L$, since the duty ratio of the short period current $I_H$ is set to an optimal value for preventing flickering of the high pressure discharge lamp L, flickering can be prevented reliably.

In a case of intending to increase the current value of the short period current $I_H$ only before polarity inversion, as shown in FIG. 5, when the gate signal $GS_1$ kept at a high level only from the input of the timing signal $TS_1$ to the input of the next timing signal $TS_3$ is outputted from the gate controller 27, since the duty ratio is increased by the chopper signal CS only before polarity inversion, a control circuit $I_0$ which forms an overcurrent only for the portion of the short period current $I_2$ in synchronization before polarity inversion is outputted from the chopper circuit 23.

Accordingly, when this is put to polarity inversion in the full-bridge circuit 5, the current value is increased only before polarity inversion of the short period current $I_H$.

Further, in a case of intending to increase the current value both before and after the polarity inversion, that is, for 1 period of the short period current $I_H$, as shown in FIG. 6, when a gate signal $GS_3$ kept at a high level after the input of the timing signal $TS_1$ to the input of the next timing signal $TS_2$ is outputted from the gate controller 27, the duty ratio for a portion of the short period current $I_H$ in synchronization with 1 period is higher by the chopper signal CS and, accordingly, a control current $I_0$ which forms an overcurrent for 1 period is outputted from the chopper circuit 3.

Accordingly, when this is inverted for the polarity by the full-bridge circuit 5, the current value for the 1-period of the short period current $I_H$ is increased.

Further, in a case of intending to form the short period current $I_H$ as a ramp wave, by outputting a control signal of gradually increasing or decreasing the current setting signal $DS_2$ outputted from the overcurrent setter 28 before and after the polarity inversion of the short period current $I_H$ respectively from the waveform setter 28, as shown in FIG. 7, a control circuit $I_0$ in which a portion in synchronization with 1-period of the short period current $I_H$ is outputted from the chopper circuit 3.

Accordingly, when the control circuit $I_0$ is put to polarity inversion by the full-bridge circuit 5 in synchronized with the timing of the polarity inversion of the synthesis signal MS, a lamp current $I_L$ in which the short period current $I_H$ is formed into a ramp wave before and after the polarity inversion is obtained.

In FIG. 7, in a case of intending to form a ramp wave only for a portion and a rectangular wave for the other portion before and after the polarity inversion of the short period current $I_B$, a control signal of gradually increasing or decreasing the current setting signal $DS_2$ corresponding to a portion to be formed into the ramp wave may be outputted from the waveform setter 28, corresponding to before and after the polarity inversion of the short period current $I_H$.

Further, in a case of intending to form a ramp wave only for the portion of the short period current $I_H$ increased for the current before and after the polarity inversion in FIG. 4 or FIG. 5, the current setting signal $DS_2$ outputted from the overcurrent setter 25 may be increased or decreased gradually.

When an aging test of lighting up identical specification of super-high pressure mercury lamps at a rated lamp power of 135 W was conducted by using the high pressure discharge lamp lighting device 1 of the invention at an over-input current value of about three times the lamp current value upon normal lighting up, using a lamp current waveform shown in FIG. 4, and setting the lighting frequency of the standard period signal $S_B$ to 100 Hz, the period for the short period signal $S_H$ to 1/2000 sect (frequency: 2 kHz), and at different 9 types of duty ratio DR=1/9, 2/8, 3/7, 4/6, 5/5, . . . 9/1, and the screen illuminance was measured, change of screen illuminance along with the arc movement could be decreased most effectively and flickering on the screen could be prevented.

Further, when screen illuminance was measured in a case of gradually increasing or decreasing the current to form a ramp wave or in a case of a predetermined rectangular wave after polarity inversion of the short period current $I_H$ for the lamp current $I_L$, flickering could be prevented more effectively in a case of the ramp wave of gradually decreasing the current.

In this case, when the period of the standard period signal $S_B$ is set to less than 1/60 sec, blinking becomes visible to cause flickering, whereas acoustic resonance phenomenon occurs when it is increased to more than 1/500 sec.

Further, in a case where the period of the short period signal $S_H$ is increased to 1/4 times or more than that of the standard period signal, load exerted on the electrode to cause violent abrasion of the electrode. On the other hand, when it was set to less than 1/30 times, the arc spot on the electrode could no more be warmed to move the arc spot and result in flickering.

The current value before and/or after the polarity inversion of the short period current $I_H$ is set to 1.2 times or more and 5 times or less the current value for the standard period current $I_B$, because this is most effective for warming the arc spot portion of the electrode and the arc spot is less moving.

Further, by making the duty ratio variable before and after the polarity inversion of the short period current $I_H$, since an optimal duty ratio different on every type of the high pressure discharge lamps can be set, this provides an advantage capable of eliminating labors and troubles of designing the high pressure discharge lamp lighting device 1 on every type of the high pressure discharge lamps L, as well as moderating the manufacturing cost, facilitating the stock control and improving the production efficiency.

As has been described above according to this embodiment, since the movement of the arc spot can be suppressed to decrease the arc movement, irrespective of the type of the high pressure discharge lamps L such as super-high pressure mercury lamps, the change of the screen illuminance can be decreased to prevent flickering on the screen.

Further, flickering on the screen can be prevented reliably by controlling each of factors such as the period, current value, and the duty ratio within respective setting ranges in accordance with the lamp power of the high pressure discharge lamp L.

Embodiment 2

FIG. 8 shows waveforms for a lamp current $I_L$, a standard period current $I_B$, and a short period current $I_H$ supplied to the high pressure discharge lamp, and the lamp current $I_L$ is formed by supplying a standard period current $I_B$ comprising a rectangular wave at a frequency of 1/500 sec or more and 1/60 sec or less that oscillates at the predetermined standard period $T_B$ and a short period current $I_H$ shown in FIG. 8 having the period $T_H$ set to 1/30 times or more and 1/4 times or less thereof alternately each for 1-period.

The standard period $T_B$ of the standard period current $I_B$ is set to 1/500 sec or more and 1/60 sec or less, because blinking caused upon polarity inversion becomes visible to result in flickering in a case where it exceeds 1/60 sec, and acoustic resonance phenomenon occurs when it is set to less than 1/50.

Further, the period $T_H$ for the short period current $I_H$ is set to 1/30 or more and 1/4 times or less the standard period current $I_B$, because excess load exerts on the electrode to cause a problem of violent abrasion of the electrode in a case where the current value is set higher than standard period current $I_B$, whereas the arc spot portion of the electrode can no more be warmed and the arc spot moves to cause flickering in a case where it is set to less than 1/30 times. The standard period current $I_B$ and the short period current $I_H$ are outputted with the duty ratio: $D_B=b_1/b_2$ and $D_H=h_1/h_2$ before and after the polarity inversion being controlled to a predetermined optical value in accordance with a high pressure discharge lamp to be lit.

Thus, in a high pressure discharge lamp causing temperature difference between electrodes when a current is supplied under identical condition between the electrodes, the lamp current can be supplied to the electrode at the lower temperature such that the electrode functions as an anode for longer time, and flickering caused by the temperature difference between the electrodes can be prevented.

In addition since different optimal values are present for the ratio of time in accordance with the type of the high pressure discharge lamps respectively, and the optimal value is equal so long as the high pressure discharge lamp is of an identical type, one type of the lighting device may suffice to cope with them without setting the duty ratio determined previously by the experiment and without designing the light device on every type of the lamps.

Further, the current value for one-half period of the short period current $I_H$ before and after the polarity inversion can be made higher than the current for the standard period current $I_B$, and the current value after the polarity inversion is set to 1.2 times or more and 5 times or less the current value for the standard period current $I_B$.

The current is set to 1.2 times or more and 5 times or less, in order for warming the arc spot portion of the electrode most effectively to make the arc spot less moving, which can prevent flickering effectively.

Further, the short period current $I_H$ may either be a rectangular wave with the current value being constant before and after the polarity inversion, or a ramp wave of gradually increasing or decreasing the current value before and/or after the polarity inversion.

A high pressure discharge lamp lighting device 40 shown in FIG. 9 is adapted to light up a high pressure discharge lamp L by supplying a lamp current $I_L$ shown in FIG. 8 in which power outputted from a DC power source 2 is inputted to a chopper circuit 3, and controlled to a more appropriate current by controlling the duty ratio in the switching device 4 and then the controlled current $I_C$ is inputted to a full-bridge circuit 5.

The full-bridge circuit 5 is adapted to conduct paired transistors $TR_1$, $TR_1$ and $TR_2$, $TR_2$ alternately and invert the DC power at a predetermined timing to form an AC lamp current $I_L$, which is outputted to a high pressure discharge lamp L started by an ignitor circuit 6.

The chopper circuit 3 and the full-bridge circuit 5 are connected with a lamp current forming device 41 of forming a lamp current $I_L$ with a current waveform of alternating a standard period current $I_B$ of a predetermined standard period $T_B$ and a short period current $I_H$ of a period $T_H$ shorter than that each by one period and capable of optionally setting the duty ratio $D_B$, $D_H$ before and after the polarity inversion of the standard period current $I_B$ and/or the short period current $I_H$.

The lamp current forming device 41 comprises an analog circuit or a microcomputer having a base data setter 42 for setting the periods $T_B$ and $T_H$ for the standard period current $I_B$ and the shorter period $I_H$, and respective duty ratios $D_B$ and $D_H$, a timing signal generator 43 for generating and outputting predetermined timing signals $TS_{11}$ to $TS_{13}$ based on the data, a standard period signal oscillator 44 and a short period signal oscillator 45 for generating a standard period signal wave $W_B$ and a short period signal wave $W_H$ for 1 period equal with the polarity inversion timing of the standard period current $I_B$ and the short period current $I_H$ and outputting them individually at predetermined timings respectively, a synthesizer 46 for synthesizing the standard period signal $S_B$ and the short period signal S outputted from the oscillators 44 and 45 to a synthesis signal MS that inverts polarity at the timing equal with the lamp current $I_L$, and a clock pulse oscillator 47 for outputting clock pulses CP for synchronizing the respective timings.

Then, the lamp current forming device 41 is connected with a full-bridge control circuit 48 for outputting a switch signal of alternately conducting paired transistors $TR_1$, $TR_1$, and $TR_2$, $TR_2$ of the full-bridge circuit 5 based on the polarity inversion timing of the synthesis signal MS outputted from the synthesizer 46, and a PWM control circuit 49 for PWM controlling the switching device 4 of the chopper circuit 3 thereby controlling the current value of the lamp current $I_L$ and the waveform of the short period current $I_H$.

Procedures up to generation of the synthesis signal MS by the lamp current forming device 41 are to be described with reference to FIG. 100.

At first, when setting the standard period $T_B$ of the standard period current $I_B$ in a range of 1/500 sec or more and 1/60 sec or less, setting the period $T_H$ for the short period current $I_H$ in a range 1/30 times or more and 1/4 times or less thereof, and setting the respective duty ratios: $D_B=b_1/(b_1+b_2)$ and $D_H=h_1/(h_1+h_2)$ in accordance with the high pressure discharge lamp to be lit to the base data setter 42 that functions as a period setter and a duty ratio setter, a standard period signal wave $W_B$ of the waveform shown in FIG. 10(a) is generated by a standard period signal oscillator 44, and a short period signal wave $W_H$ of a waveform shown in FIG. 10(b) is generated by a short period signal oscillator 45.

The timing signal generator 43 outputs three types of timing signals $TS_{11}$ to $TS_{13}$ synchronized with the clock pulse CP based on each data set to the base data setter 42 (refer to FIG. 10(c) and FIG. 11).

The timing signal $TS_{11}$ is a signal as a trigger for outputting the standard period signal wave $W_B$ which is composed of a timing pulse $TP_{11}$ outputted at a time interval of: standard period $T_B$+period $T_H$.

The timing signal $TS_{12}$ is a signal as a trigger of outputting the standard period signal wave $W_B$, which is composed of a timing pulse $TP_{11}$ outputted after lapse of the standard period $T_B$ after output of the standard timing pulse $TP_{11}$.

The timing signal $TS_{13}$ is for synchronization to the polarity inversion timing of the short period current $I_H$, which is composed of a timing pulse $TP_{13}$ outputted on every lapse of time: $D_{11} \times T_H$ till the polarity inversion determined by the period $T_H$ and the duty ratio $D_H$.

The standard period signal oscillator 44 generates a standard period signal wave $W_B$ for 1 period equal with the polarity inversion timing of the standard period current $I_B$ to output a standard period signal $S_B$ by outputting the same each by 1 period on every input of the timing pulse $TP_{11}$ of the timing signal $TS_{11}$.

The short period signal oscillator 45 generates a standard period signal wave $W_H$ for 1 period equal with the polarity inversion timing of the standard period current $I_H$ and outputs a short period signal $S_H$ by outputting the same each by 1 period on every input of the timing pulse $TP_{12}$ of the timing signal $TS_2$.

The standard period signal $S_B$ and the short period signal $S_H$ generated from the standard period signal oscillator 44 and the short period signal oscillator 45 are inputted to the synthesizer 46, and they are superposed to generate a synthesis signal MS of alternately outputting the standard period signal wave $W_B$ and a short period signal wave $W_H$ each by 1 period, which is outputted to the full-bridge control circuit 48.

Since the polarity inversion timing of the synthesis signal MS is equal with the polarity inversion timing of the lamp current $I_L$, the full-bridge control circuit 48 outputs a switch signal for alternately conducting paired transistors $TR_1$, $TR_1$ and $TR_2$, $TR_2$ of the full-bridge circuit 5 based on the polarity inversion timing of the synthesis signal MS, by which the current supplied as a DC current is inverted for the polarity in synchronization with the synthesis signal MS to form an AC lamp current $I_L$.

Further, the timing signal generator 43 is connected by way of a current controller 51 for setting the current values for the standard period current $I_B$ and the short period current $I_H$ to the CWM control circuit 49.

The current controller 51 has a standard current setter 52 for outputting a standard current setting signal $DS_1$ in accordance with the current value of the standard period current $I_B$ of the lamp current $I_L$ and an overcurrent setter 53 outputting an overcurrent setting signal $DS_2$ in accordance with the current value for the short period current $I_H$ set to 1.2 times or more and 5 times or less of standard period current $I_B$.

Further, it has a gate 54 for supplying a current setting signal DS as a standard current setting signal $DS_1$ of an overcurrent setting signal $DS_2$ outputted from each of the setters 52 and 53 to the PWM control circuit 49 and passed selectively and a gate controller 55 for controlling the gate 54.

The gate controller 55 outputs gate signals $GS_{11}$ to $GS_{13}$ for switching the standard current setting signal $DS_1$ and the overcurrent setting signal $DS_2$ based on each of the timing signals $TS_{11}$ to $TS_{13}$ as shown in FIG. 11(a) to (d).

The gate signal $GS_{11}$ is used in a case of forming a lamp current $I_L$ having a high current value only before the polarity inversion of the short period current $I_H$ and is at a high level only for the period after the input of the timing pulse $TP_{13}$ of the timing signal $TS_{13}$ till the input of the timing pulse $TP_{11}$ of the timing signal $TP_{11}$.

Further, the gate signal $GS_{13}$ is used in a case of forming a lamp current $I_L$ having a higher current value only after the polarization inversion of the short period current $I_H$ and is at a high level for during period after input of the timing pulse $TP_{13}$ of the timing signal $TS_{13}$ till the input of the timing pulse $TP_{11}$ of the timing signal $TS_{11}$ as shown in FIG. 11(b).

Further, the gate signal $GS_{13}$ is used in a case of forming a lamp current $I_L$ having a higher current value both before and after the polarity inversion of the short period current $I_H$, that is, for 1 period as shown in FIG. 11(c) and it is at a high level during a period after the input of the timing pulse $TP_{12}$ of the timing signal $TS_{12}$ till the input of the timing pulse $TP_{11}$ of the timing signal $TS_{11}$.

Further, the gate signal $GS_{13}$ is used in a case of forming a lamp current $I_L$ having a higher current value before and after the polarity inversion, that is, for 1 period of the short period current $I_H$ and is at a high level for a period after the input of the timing pulse $TP_{12}$ of the timing signal $TS_{12}$ till the input of the timing pulse $TP_{11}$ of the timing signal $TS_{11}$ as shown in FIG. 11(c).

In a case of forming a lamp current $I_L$ in which the current value of the short period current $I_H$ is always equal with the standard current of the standard period current $I_B$, a gate signal $GS_{14}$ normally kept at a low level may be outputted as shown in FIG. 11(d).

In any of the cases, during the period where the gate signals $GS_{11}$ to $GS_{14}$ are kept at a low level, since the overcurrent setting signal $DS_1$ outputted from the overcurrent setter 52 passes the gate 54 and is supplied to the PWM control circuit 49, by which the switch device 4 conducts on-off operation at a low duty ratio by the chopper signal CS outputted from the PWM control circuit 49, the current value of the power outputted from the DC power source 2 is supplied at a rated current set, for example, as the current value for the standard period current $I_B$.

During the period where the gate signals $GS_{11}$ to $GS_{14}$ are kept at a high level, since the overcurrent setting signal $DS_{12}$ outputted from the overcurrent setter 3 passes the gate 54 and is supplied to the PWM control circuit 49, and the switch device 4 conducts on-off operation at a high duty ratio by the chopper signal CS outputted from the PWM control circuit 49, the current value of the power outputted from the DC power source 2 is supplied at a current value 1.2 times to 5 times the rated current set, for example, as the current value of the standard period current $I_B$.

That is, since the current setting signal DS supplied to the PWM control circuit 49 comprises a standard current setting signal $DS_1$ and the overcurrent setting signal $DS_2$, and the duty ratio of the chopper signal CS changes in accordance with the level, the current value for the portion of the short period current $I_H$ synchronized with that before and/or after the polarization inversion can be set to 1.2 times or and 5 times or more less of the standard frequency current $I_B$.

Further, the overcurrent setter 53 is connected with a waveform setter 56 for gradually increasing or decreasing the current value to form a ramp wave before and/or after the polarity inversion of the short period current $I_H$.

The waveform setter 56 outputs a control signal for gradually increasing or decreasing the current setting signal $DS_2$ outputted from the overcurrent setter 53 before and after the polarity inversion of the short period current $I_H$ respectively.

FIG. 12(a) to (d) shows lamp currents $I_L$ with the current value being increased or decreased gradually before or after the polarity inversion of the short period current $I_H$ and a current setting signal DS and a control signal $I_C$ forming respective lamp currents $I_L$ and FIG. 12(e) to (h) shows lamp currents $I_L$ where current value is increased or decreased gradually on both before and after the polarity inversion of the short period current $I_H$ and the current setting signals DS and the control currents $I_C$ for forming the respective currents $I_L$.

Since the current value for the control current $I_C$ is in proportion with the duty ratio of the chopper signal CS and the duty ratio depends on the level of the current setting signal DS, as shown in FIG. 12, the short period current $I_H$ of the lamp current $I_L$ can be formed as a ramp wave by changing the level for the overcurrent setting signal $DS_2$ in view of time, the short period current $I_H$ of the lamp current $I_L$ can be formed as a ramp wave.

The foregoings show a constitutional example of the invention and the operation thereof is to be described.

At first, an experiment was conducted previously for a discharge lamp of a type identical with the high pressure discharge lamp L to be lit, optimal values capable of suppressing flickering are determined for the periods $T_B$ and $T_H$, and the duty ratios $D_B$ and $D_H$ before polarity inversion of the standard period current $I_B$ and the short period current $I_H$, and the values are set to the base data setter 42.

Further, in the same manner, current values for the standard period current $I_B$ and the short period current $I_H$ are set to the current setters 52 and 53 and, in a case of using an overcurrent, the current value and a portion for the overcurrent (before and/or after the polarity inversion) are set to the gate controller 55.

Further, in a case of using a ramp wave of gradually increasing or decreasing the current value, the shape of the ramp wave (gradually increasing or decreasing) and a portion to form the ramp wave (portion before and/or after the polarity inversion) are set to the waveform setter 56.

Thus, three types of timing signals $TS_{11}$ to $TS_{13}$ are outputted from the timing signal generator 43, the standard period signal $S_B$ outputted from the standard period signal oscillator 44 and the short period signal $S_H$ outputted from the short period signal oscillator 45 are superposed in the synthesizer 46 to form a synthesis signal MS, which is outputted to the full-bridge control circuit 48.

Further, a current setting signal DS of supplying the standard setting signal $DS_1$ and the overcurrent setting signal $DS_2$ outputted from the current setters 52 and 53 under switching at a predetermined timing is supplied by way of the gate 54 to the PWM control circuit 49.

In a case of forming only the current value before the polarity inversion of the short period current $I_H$ as an overcurrent higher than the standard current, as shown in FIG. 11, when the gate signal $GS_1$ is outputted from the gate controller 55, a current setting signal DS having a portion corresponding to that before the polarity inversion of the short period current $I_1$ as the overcurrent setting signal $DS_2$, and other portion as the standard current setting signal $DS_1$ is outputted to the PWM control circuit 49.

A chopper signal CS at a duty ratio in accordance with the level of the current setting signal DS is outputted from the PWM control circuit 49, and the switching device 4 conducts on-off operation at the duty ratio of the chopper signal CS.

This controls the current value of the DC power outputted from the power source 2 to output a control current $I_C$ in which the portion of the short period of current $I_H$ corresponding to that before the polarity inversion is equal with the overcurrent and other portions than described above is equal with the standard current from the chopper circuit 3 to the full-bridge circuit 5.

Then, the paired transistors $TR_1$, $TR_1$, and $TR_2$ and $TR_2$ in the full-bridge circuit 5 are conducted alternately by the full-bridge control circuit 48 at a timing of the polarity inversion equal with the synthesis signal MS, and the control current $I_C$ is inverted for polarity in synchronization with the synthesis signal MS to form a desired lamp current $I_L$.

In a case of forming only the current value after the polarity inversion of the short period current $I_H$ as an overcurrent higher than the standard current, as shown in FIG. 11(*b*), when the gate signal $GS_2$ is outputted from the gate controller 55, a current setting signal DC having a portion of the short period current $I_H$ corresponding to that after the polarity inversion as the overcurrent setting signal $DS_2$ and other portion as the standard current setting signal $DS_1$ is outputted to the PWM control circuit 49.

The switch device 4 conducts on-off operation by the chopper signal CS outputted from the PWM control circuit 40, and the current value of the DC power outputted from the power source 2 is controlled to output a control current $I_C$ having a portion of the short period current $I_H$ corresponding to that after the polarity inversion equal with the overcurrent and other portion is equal with the standard current from the chopper circuit 3 to the full-bridge circuit 5.

Then, the control current $I_C$ is inverted for the polarity in synchronization with the synthesis signal MS by the full-bridge circuit 5 to form a desired lamp current $I_L$.

In a case of setting the current value before and after the polarity inversion of the short period current $I_H$ to an overcurrent higher than the standard current, when the gate signal $CS_3$ is outputted from the gate controller 55, a current setting signal DS having a portion corresponding to 1 period of the short period current $I_H$ as a overcurrent setting signal $DS_2$, and a portion corresponding to 1 period of the standard period current $I_B$ as a standard current setting signal $DS_1$ is outputted to the PWM control circuit 49.

The switching device 4 conducts on-off operation by the chopper signal CS outputted from the PWM control circuit 49, and the current value of the DC power outputted from the power source 2 is controlled and a control current $I_C$ having a portion of the short period current $I_H$ corresponding to that after the polarity inversion equal with the overcurrent and other portion than described above equal with the standard current is outputted from the chopper circuit 3 to the full-bridge circuit 5.

Then, the control circuit $I_C$ is inverted for the polarity in synchronization with the synthesis signal MS by the full-bridge circuit to form a desired lamp current $I_L$.

In a case where the current value for the short period current $I_H$ is made equal with the standard current, when the gate signal $GS_4$ kept at the low level is outputted from the gate controller 55 as shown in FIG. 11(*d*), the gate controller 55 outputs the gate signal $CS_4$ to output the standard current setting signal $DS_1$ continuously as the current setting signal DS to the PWM control circuit 49.

Thus, the switch device 4 conducts on-off operation by the chopper signal CS outputted from the PWM control circuit 49, and the current value for the DC power outputted from the power source 2 is controlled and a control current $I_C$ being normally equal with the standard current is outputted from the chopper circuit 3 to the full-bridge circuit 5.

Further, in a case of setting the short period current $I_H$ as a ramp wave, as shown in FIG. 12, a control signal of gradually increasing or decreasing the overcurrent switching signal $DS_2$ respectively before and after the polarity inversion of the short period current $I_H$ is outputted from the waveform setter 56 to the overcurrent setter 53 to ramp overcurrent setting signal $DS_2$ outputted from the overcurrent setter 53, thereby outputting, a chopper signal CS accompanying the change of the duty ratio in accordance with the change of the level from the PWM control circuit 49 to output a control a current $I_C$ in which a portion corresponding to the short period current $I_2$ is ramped.

Accordingly, when the control current $I_C$ is inverted for the polarity by the full-bridge circuit 5 in synchronization with the polarity inversion timing of the synthesis signal MS, lamp currents $I_L$ to obtain the short period current $I_H$ formed into a ramped wave before and after the polarity inversion of the short period current $I_H$ respectively.

When an aging test of lighting up identical specification of super-high pressure mercury lamps at a rated lamp power of 135 W was conducted by using the high pressure discharge lamp lighting device 40 of the invention at an over-input current value of about three times the lamp current value upon normal lighting up, using various lamp currents $I_L$ shown in FIG. 11 and FIG. 12, and various setting the periods $T_B$ and $T_H$, and the duty ratios $D_B$ and $D_H$ of the standard period current $I_B$ and the short period current $I_H$ and the screen illuminance was measured, change of screen illuminance along with the arc movement could be decreased most effectively under the following conditions and flickering on the screen could be prevented.

Period of standard period current $I_B$; $T_B = 1/100$ sec,
Duty ratio of standard period current $I_B$; $D_S = 5/10$ ($b_1:b_2 = 5:5$),
Period of short period current $I_H$; $T_B = 1/2000$ sec,
Duty ratio of short period current $I_H$; $D_H = 4/10$ ($h_1:h_2 = 4:6$),
Overcurrent; 2.2 times the standard current value
Overcurrent portion; after polarity inversion of short period current $I_H$
Waveform for overcurrent portion; increased gradually Accordingly, in a case of lighting up a discharge lamp of a type identical with the super-high pressure mercury discharge lamp, when lighting up is conducted while setting the respective values determined in the experiment to the lamp current forming device 41 of the high pressure discharge lamp lighting device 40, since they can be lit under the same conditions as in Example, it can be expected that the change of screen illuminance along with arc movement can be decreased most effectively, and when a lighting up test was conducted under the same conditions as those in the experiment except for setting the current value not as an over-input but at a lamp current value upon normal lighting up.

In this case, when the standard period $T_B$ of the standard period signal $S_B$ is set to more than 1/60 sec, blinking becomes visible to cause flickering, whereas acoustic resonance phenomenon occurs when standard period is less than 1/500 sec.

Further, in a case where the period $T_H$ of the short period signal $I_H$ is increased to 1/4 times more than the standard period $T_B$, load was applied on the electrode to cause violent abrasion of the electrode. On the other hand, when it was set to less than 1/30 times the standard period $T_B$ the arc spot portion on the electrode could no more be warmed to move the arc spot portion to result in flickering.

The current value before and/or after the polarity inversion of the short period current $I_H$ is set to 1.2 times or more and 5 times or less the current value for the standard period current $I_B$, because this is most effect for warming the arc spot portion of the electrode and the arc spot is made less moving.

Further, by making the duty ratio variable before and after the polarity inversion of the short period current $I_H$, since a optimal duty ratio different on every type of the high pressure discharge lamps can be set, this provides an advantage capable of eliminating labors and troubles of designing the high pressure discharge lamp lighting device 40 on every type of the high pressure discharge lamps L, as well as moderating the manufacturing cost, facilitating the stock control and improving the production efficiency.

Further, since the period of the standard period current $I_B$ is longer as compared with that of the short period current $I_H$, change of the duty ratio, even when it is small, gives a significant effect on the change of the polarity of the power supplied to each of the electrodes.

Accordingly, in a case of lighting up a high pressure discharge lamp that causes remarkable temperature difference when lighting up by a usual lamp current, the temperature difference is generally eliminated by the duty ratio $D_S$ for the standard period current $I_B$ and fine control may be conducted by controlling the duty ratio $D_H$ for the short period current $I_H$.

Further, in a case where no remarkable temperature difference is caused between the electrodes, it may suffice to control only the duty ratio $D_{11}$ for the short period current $I_H$ as described above.

As has been described above, according to this embodiment, since the duty ratio can be controlled variably before and after the polarity inversion of the standard periodical table $I_B$ and the short period current $I_H$, even in a high pressure mercury lamp that may cause temperature difference between the electrodes when an AC current is supplied, it can provide an excellent effect capable of eliminating the temperature difference between the electrodes by controlling the duty ratio to an optimal value in accordance with the high pressure mercury lamp, thereby capable of effectively suppressing flickering attributable thereto.

Further, it has an effect capable of reliably preventing flickering on the screen by controlling each of factors such as the period, the current value, and the duty ratio within each of the setting ranges in accordance with the type of the high pressure mercury lamp L, and the lamp power.

INDUSTRIAL APPLICABILITY

The present invention is suitable to be used for application in light source device for back light such as liquid crystal projectors uniform illuminance and extremely less flickering are demanded severely.

DESCRIPTION OF THE DRAWINGS

FIG. 11 is an explanatory view showing the procedure of forming the lamp current.

Figure 1:
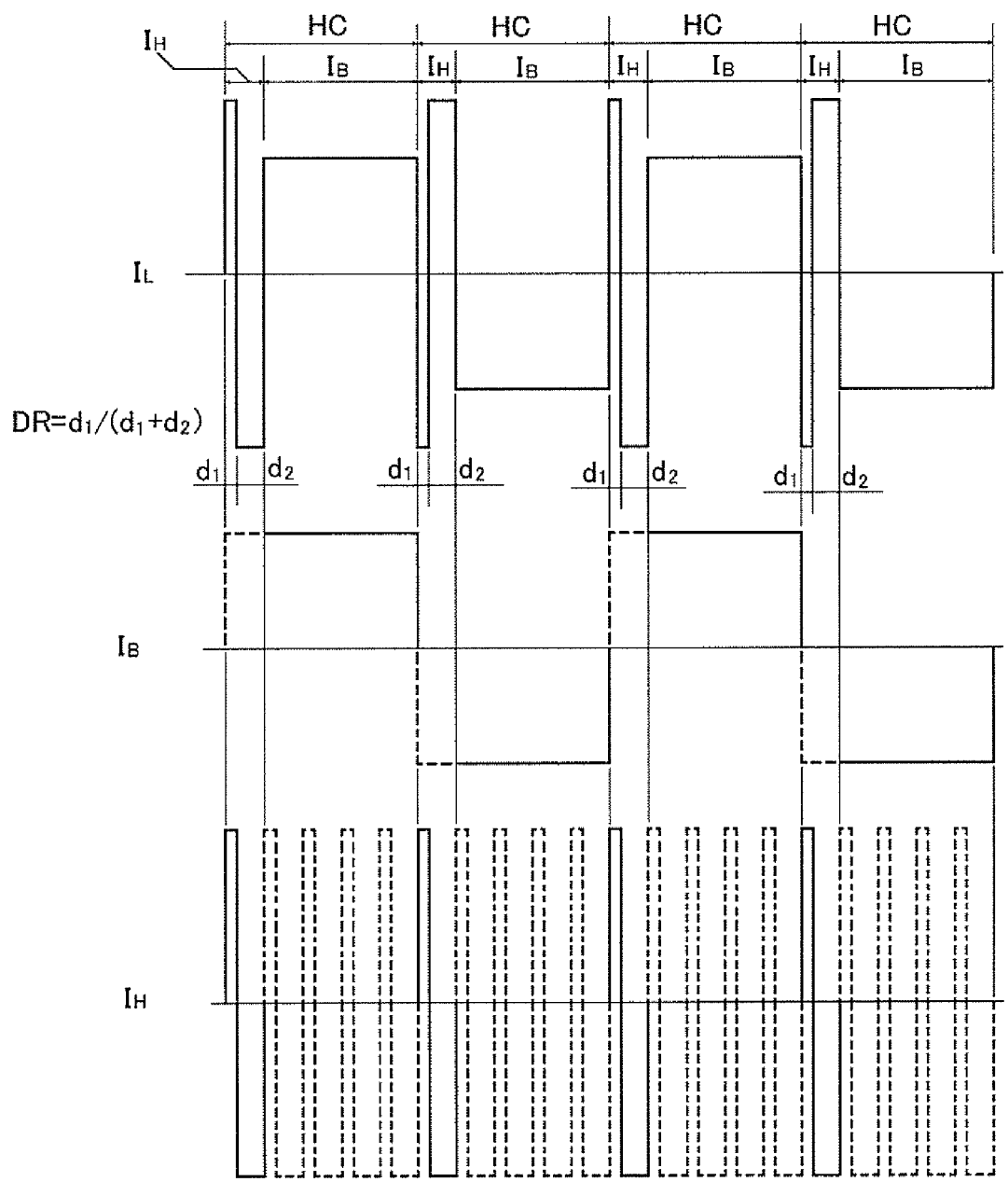
FIG. 1 is an explanatory view showing a lamp current generated by a lighting device according to the invention.
Figure 2:
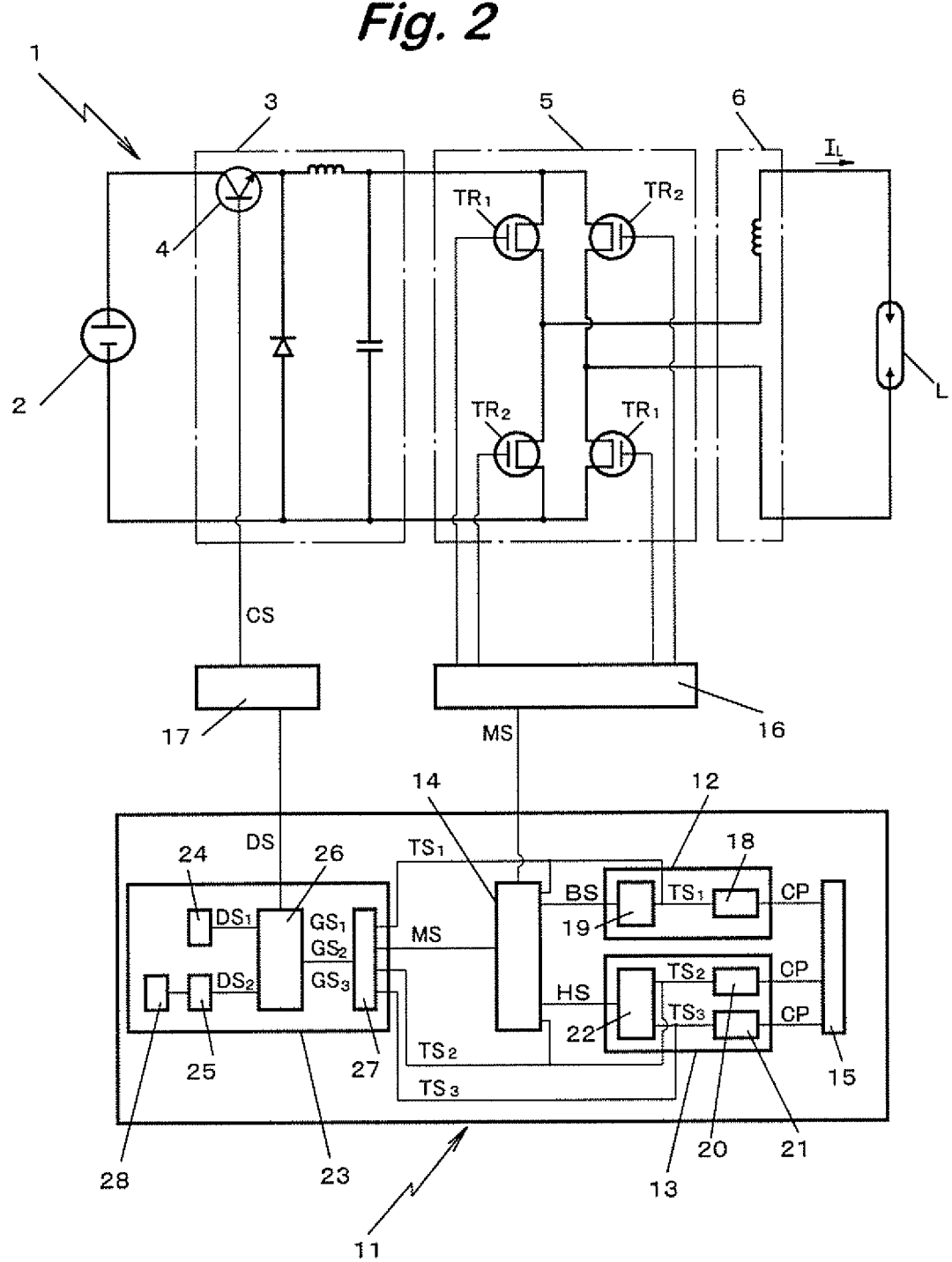
FIG. 2 is a block diagram showing a lighting device according to the invention.
Figure 3:
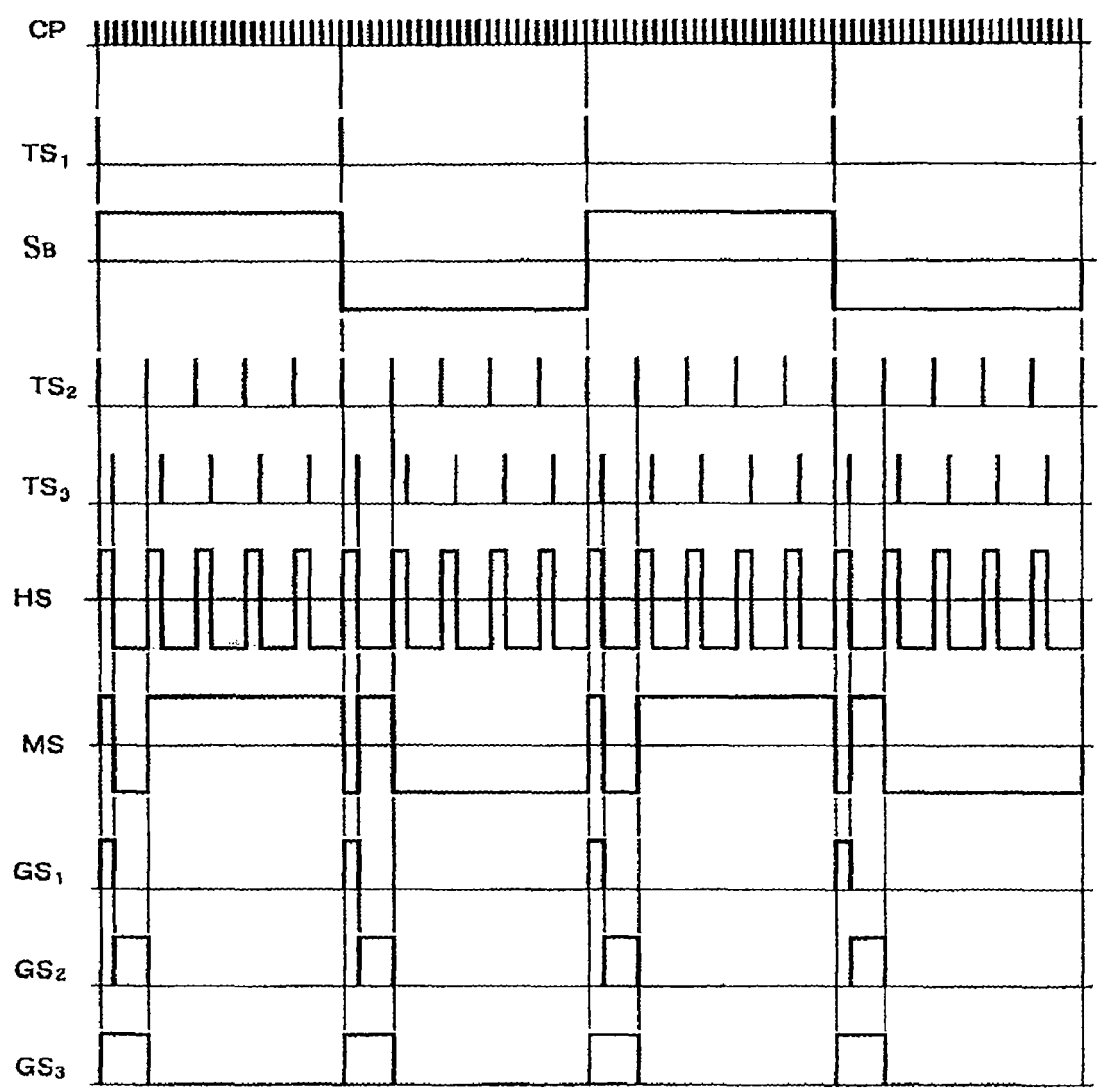
FIG. 3 is an explanatory view showing each of signal wave forms.
Figure 4:
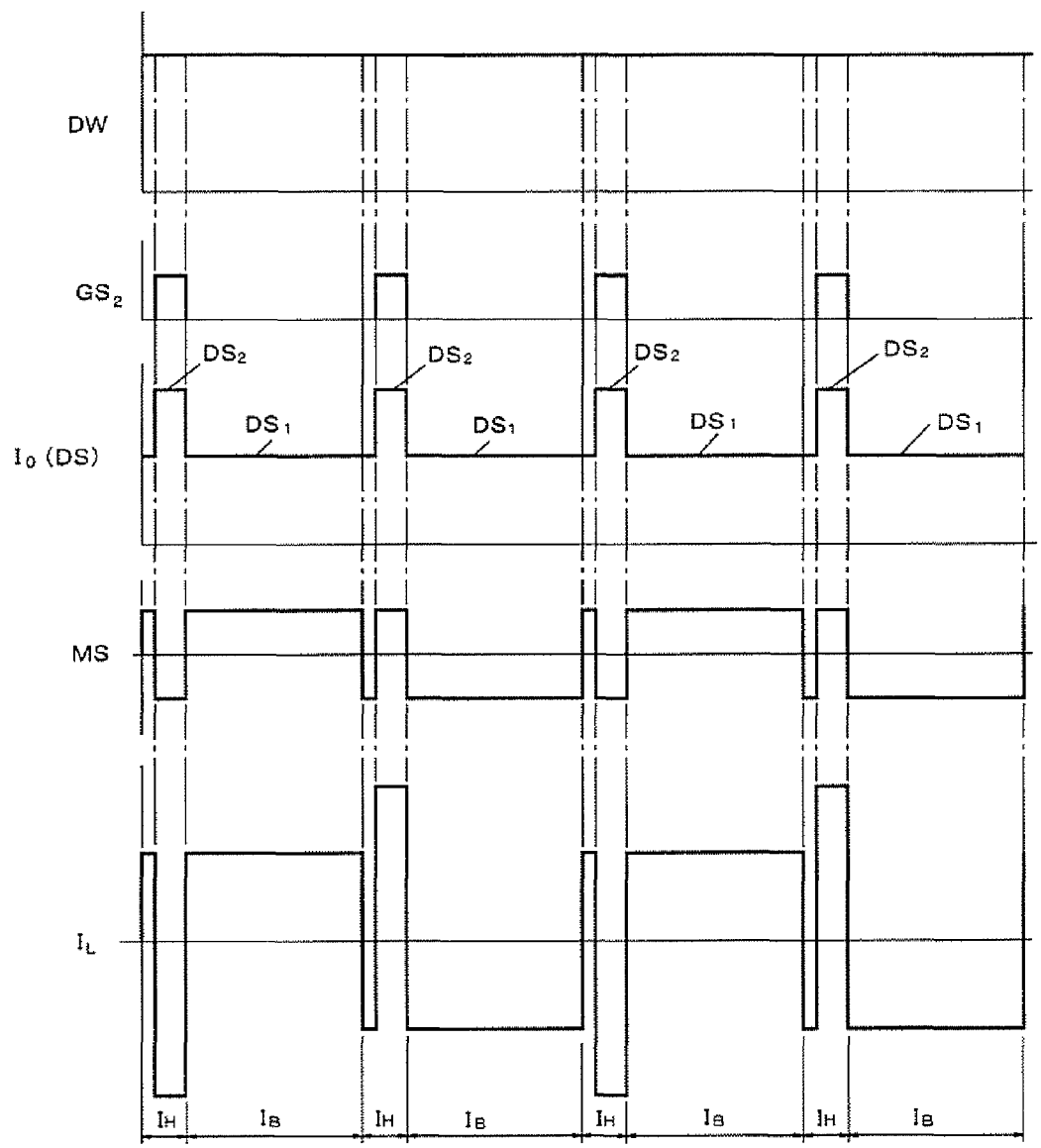
FIG. 4 is an explanatory view showing the process for forming a lamp current.
Figure 5:
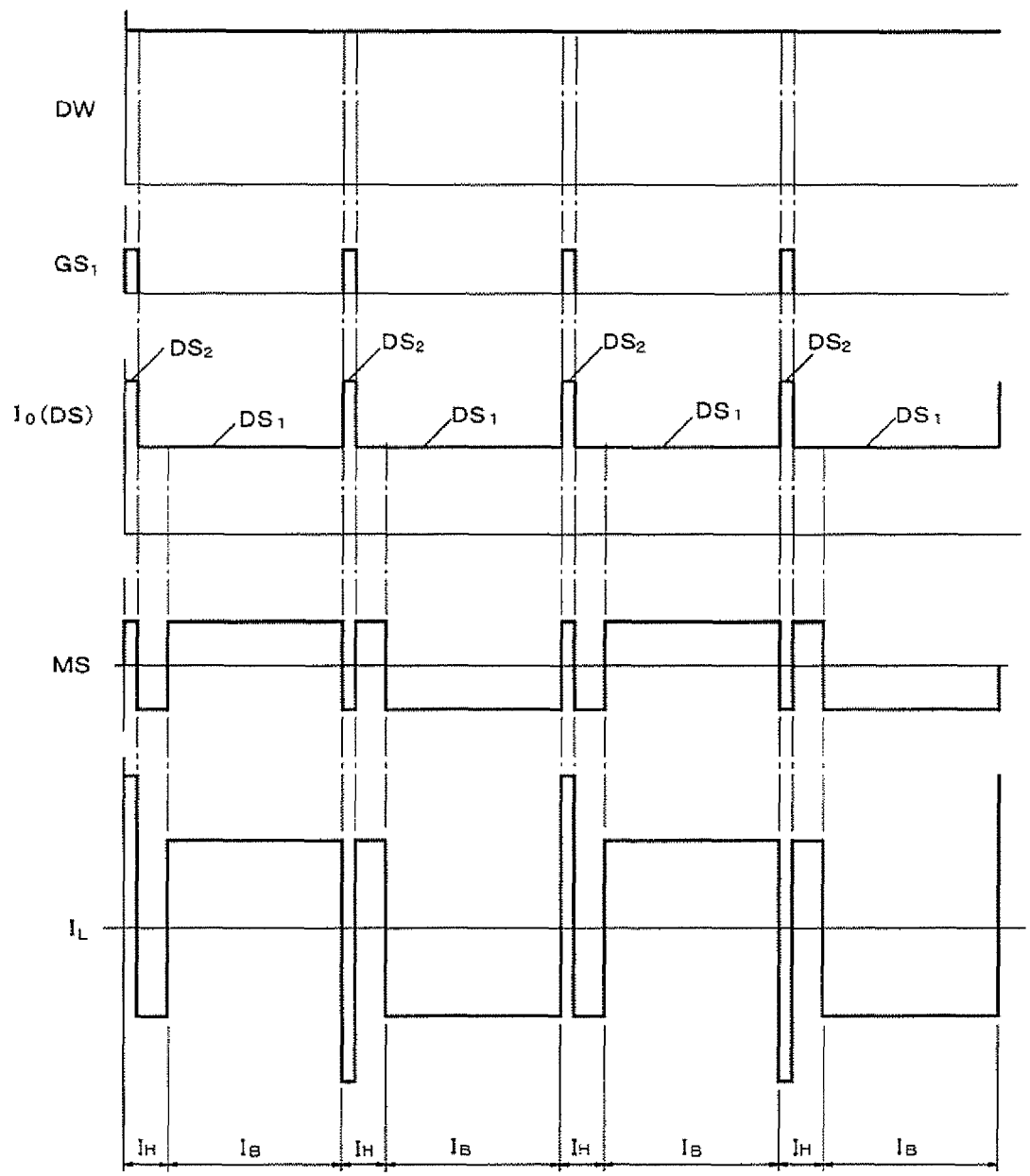
FIG. 5 is explanatory views showing other lamp currents.
Figure 6:
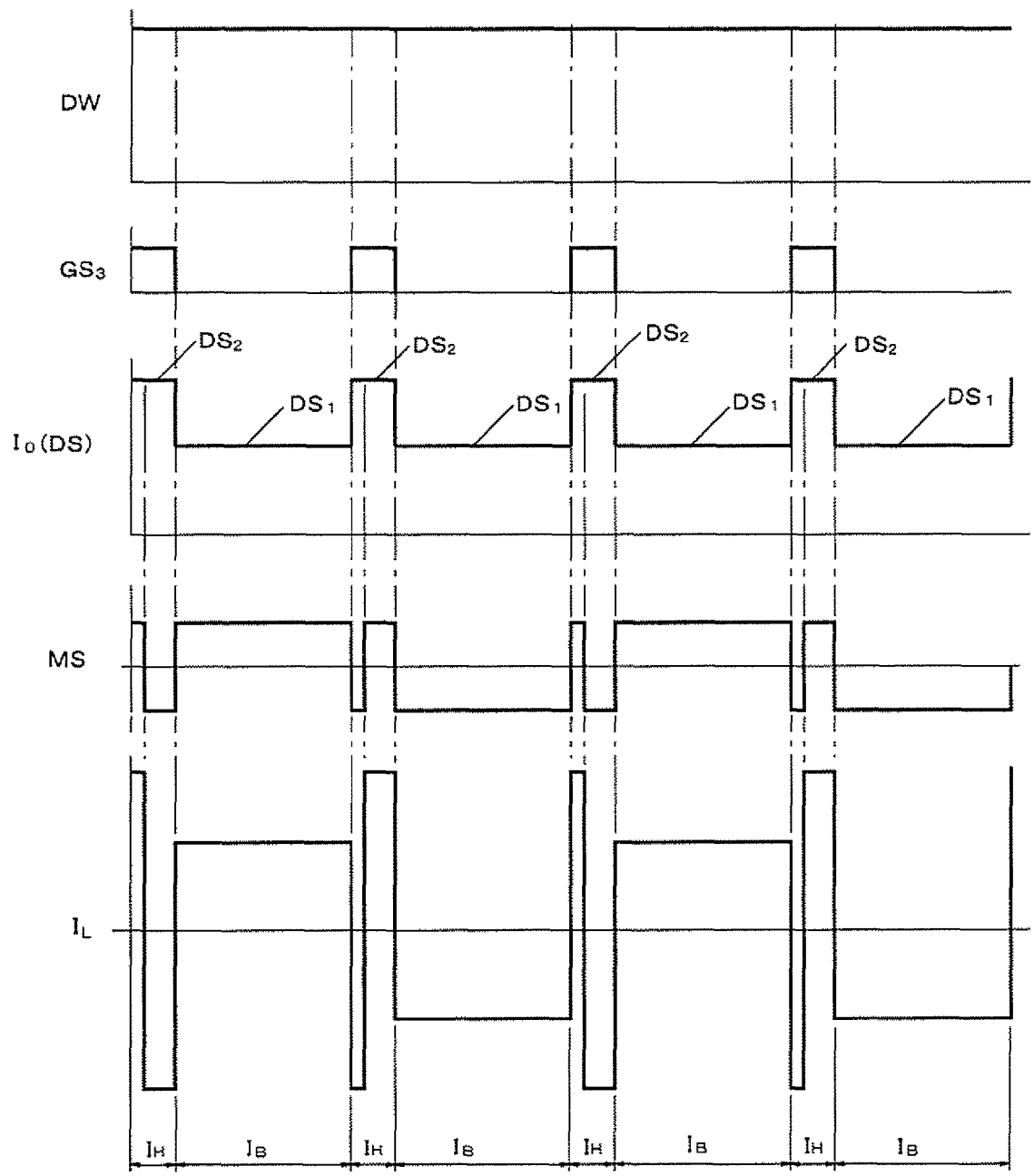
FIG. 6 is explanatory views showing other lamp currents.
Figure 7:
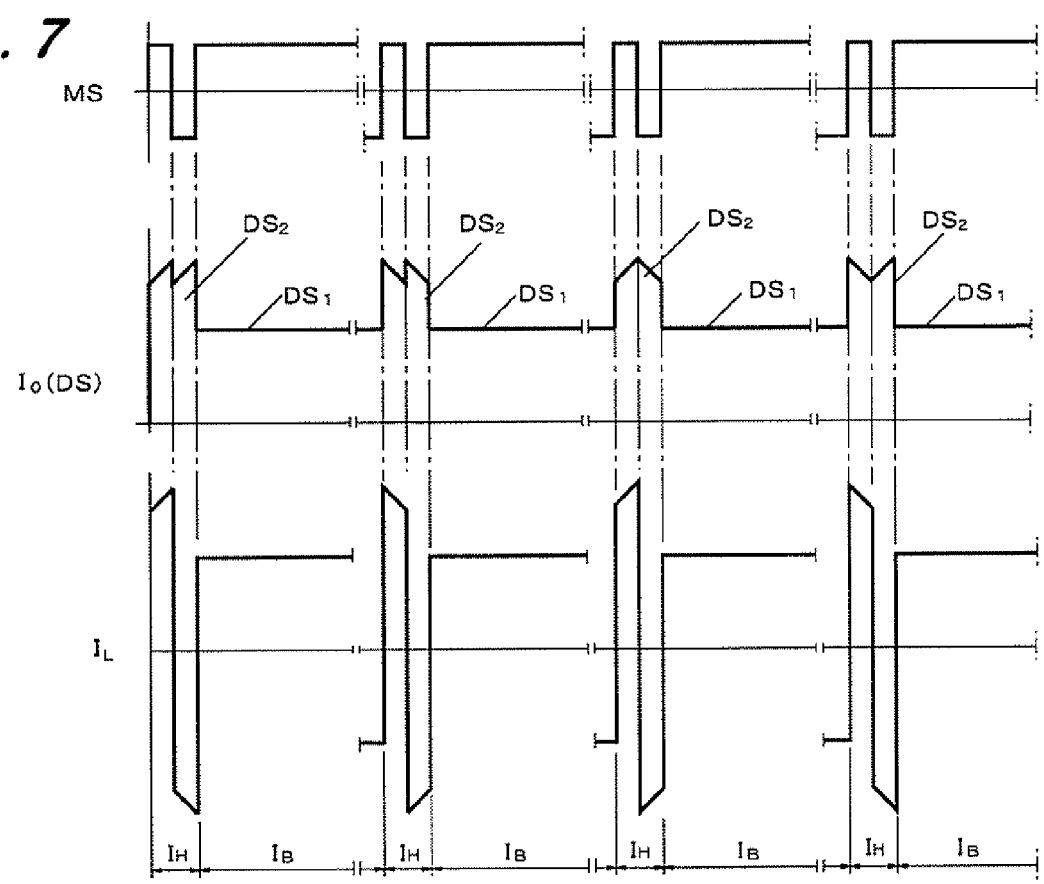
FIG. 7 is explanatory views showing other lamp currents.
Figure 8:
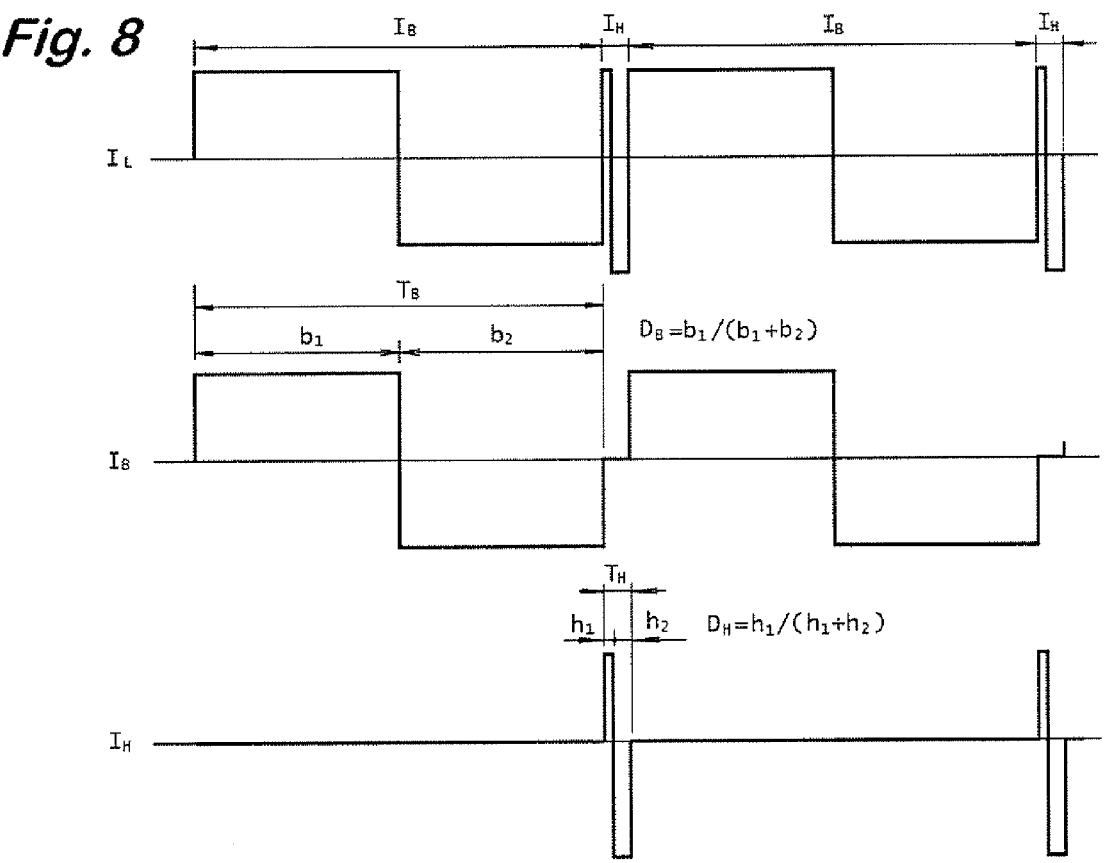
FIG. 8 is an explanatory view showing a lamp current generated by another lighting device of the invention.
Figure 9:
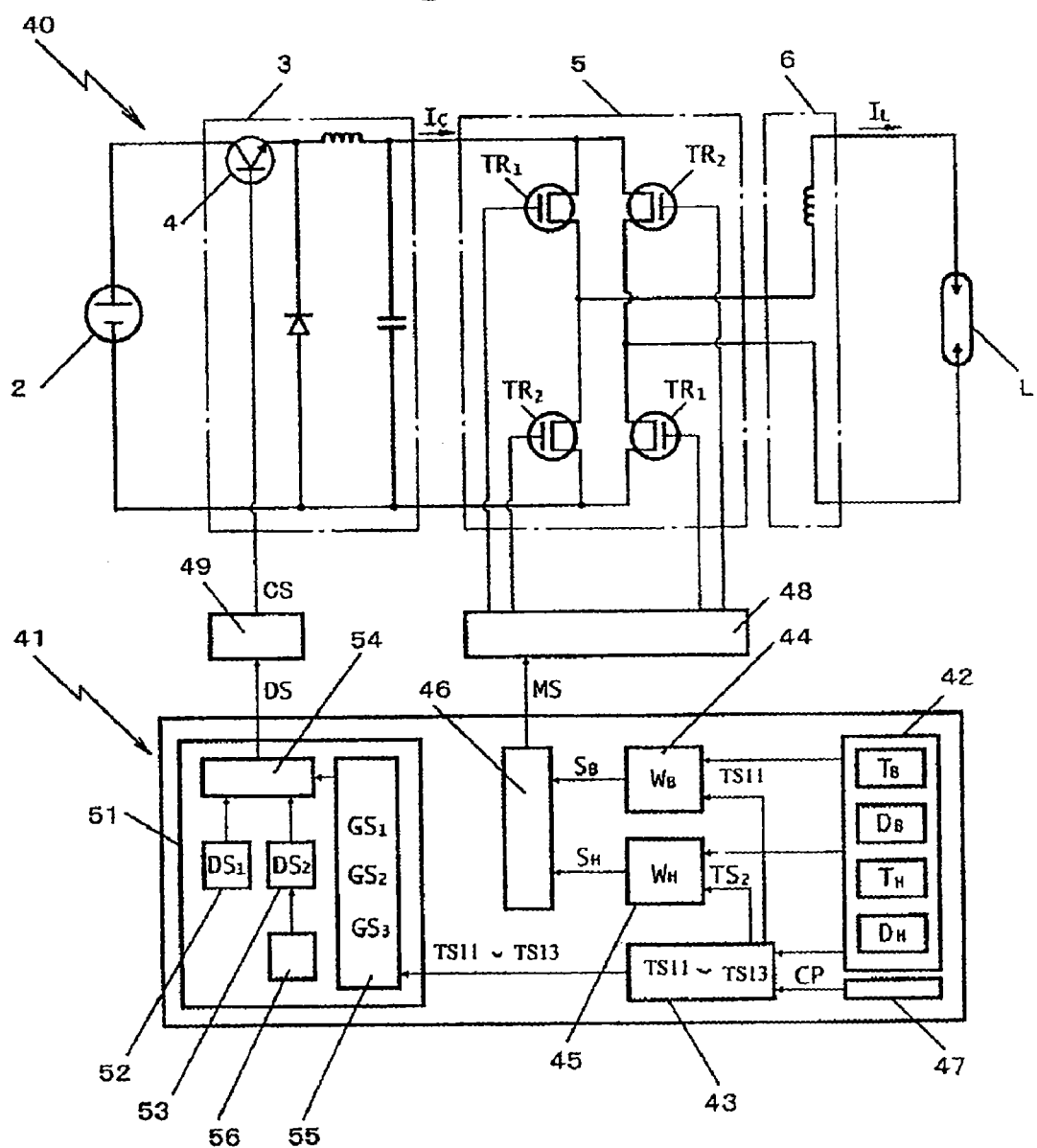
FIG. 9 is a block diagram showing another lighting device according to the invention.
Figure 10A:
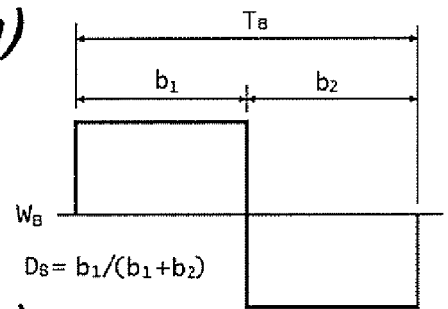
FIG. 10 is an explanatory view showing the procedure of forming a synthesis wave.
Figure 10B:
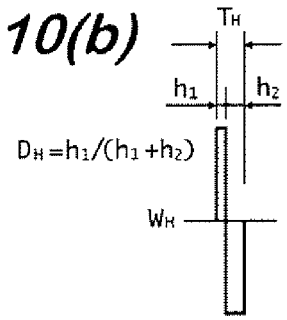
Figure 10C:
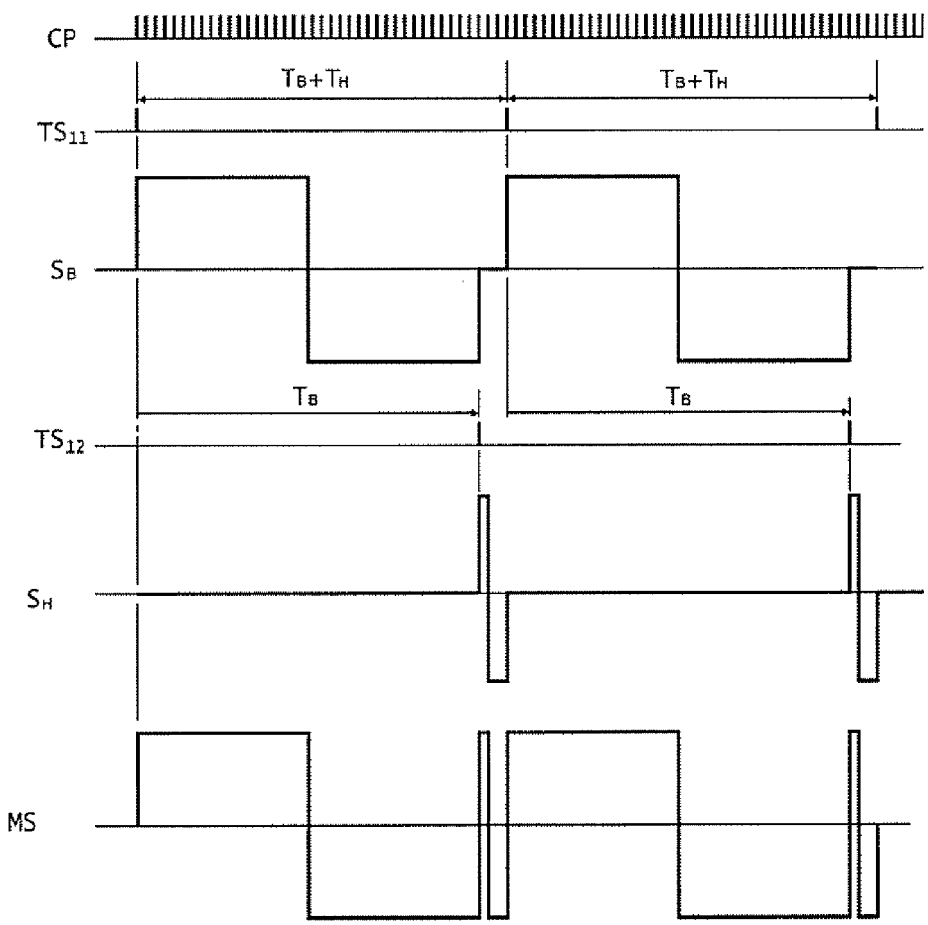
Figures 12A, 12B, 12C, 12D:
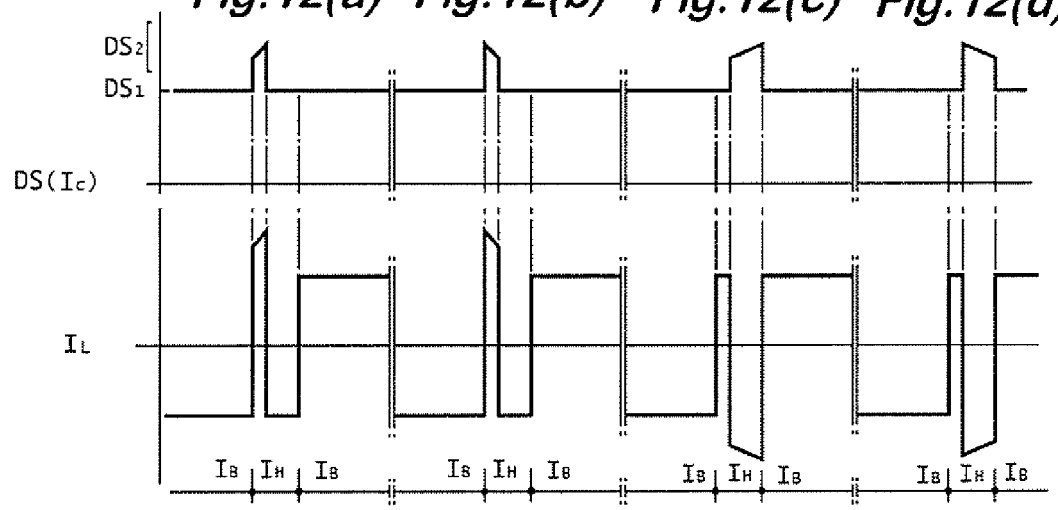
FIG. 12 is an explanatory view showing another example of the lamp current.
Figures 12E, 12F, 12G, 12H:
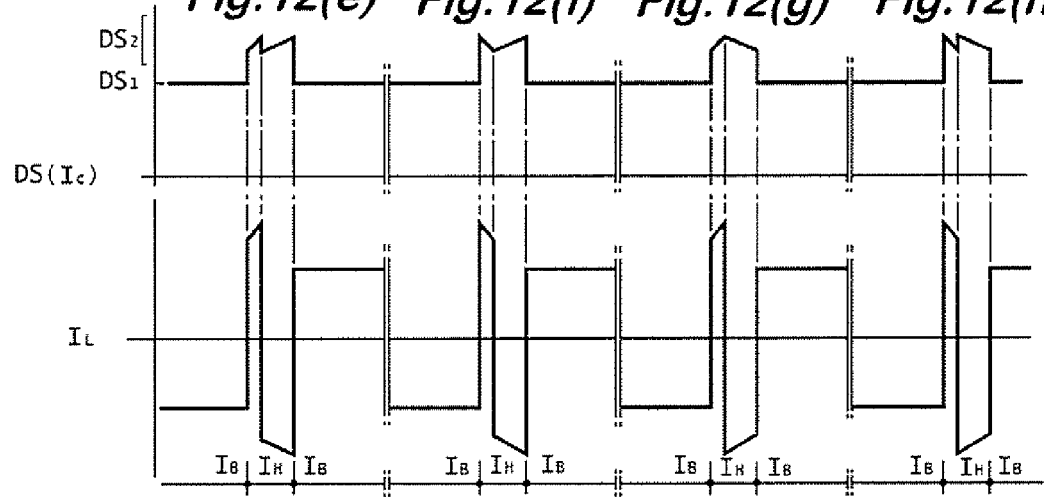
Figure 13:
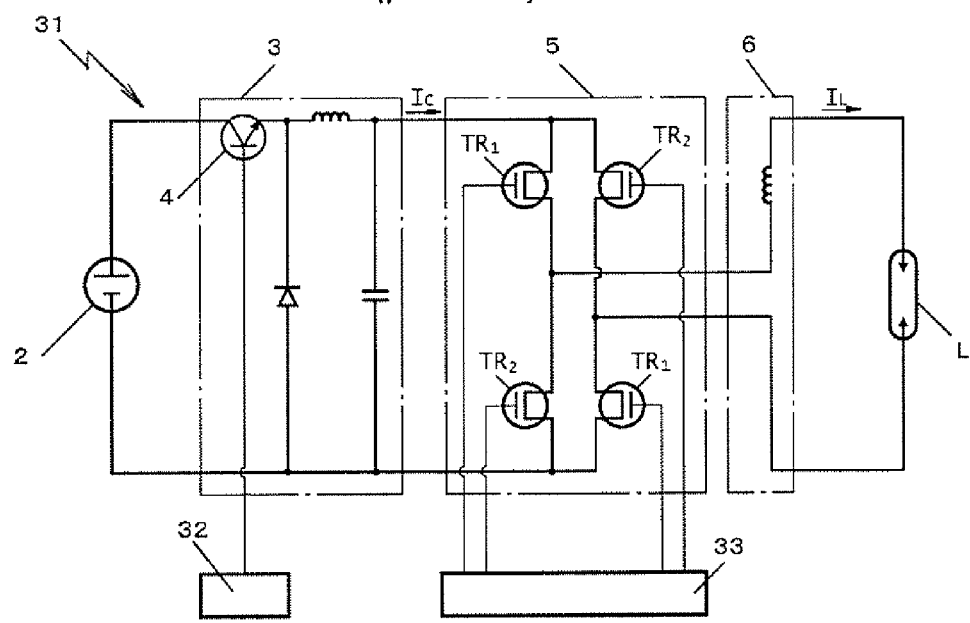
FIG. 13 is a block diagram showing an existent lighting device.

DESCRIPTION FOR REFERENCES 1 high pressure discharge lamp lighting device
3 chopper circuit
5 full-bridge circuit
L high pressure discharge lamp
11 lamp current forming device
12 standard period signal outputting device
13 short period signal outputting device
14 synthesizer circuit
16 full-bridge control circuit
17 PWM control circuit
23 current controller
28 waveform setter
$I_L$ lamp current
$I_B$ standard period current
$I_H$ short period current

The invention claimed is:

1. A high pressure discharge lamp lighting device for supplying an AC lamp current to light up a high pressure discharge lamp, comprising:

a lamp current former that forms a lamp current having a waveform in which one cycle of a standard period current with a polarity inversion of a predetermined standard period and one cycle of a short period current with a polarity inversion of a period shorter than the predetermined standard period appear alternately, and in which a duty ratio before the polarity inversion for at least one of the standard period current and the short period current is different than a duty ratio after the polarity inversion, wherein the lamp current former has a current controller that sets at least one of a current value before the polarity inversion for the short period current and a current value after the polarity inversion for the short period current to be higher than a current value of the standard period current.

2. The high pressure discharge lamp lighting device according to claim 1, wherein the lamp current former has a waveform setter that gradually increases or gradually decreases at least one of the current values before and after the polarity inversion for the short period current to form a ramp wave.

3. The high pressure discharge lamp lighting device according to claim 1, wherein the current controller sets the current value of the short period current to 1.2 times or more and 5 times or less the current value of the standard period current.

4. The high pressure discharge lamp lighting device according to claim 1, wherein the lamp current former has a period setter that sets the predetermined standard period of the standard period current to $\frac{1}{500}$ sec or more and $\frac{1}{60}$ sec or less and that sets the period of the short period current to $\frac{1}{30}$ times or more and $\frac{1}{4}$ times or less the predetermined standard period.

5. A method of lighting up a high pressure discharge lamp for supplying an AC lamp current to light up a high pressure discharge lamp, comprising:
   supplying a lamp current having a current waveform in which one cycle of a standard period current with a polarity inversion of a predetermined standard period and one cycle of a short period current with a polarity inversion of a period shorter than the predetermined standard period appear alternately, while controlling a duty ratio before the polarity inversion for at least one of the standard period current and the short period current being different than a duty ratio after the polarity inversion, and
   setting at least one of a current value before the polarity inversion for the short period current and a current value after the polarity inversion for the short period current to be higher than a current value of the standard period current.

6. The method of lighting up a high pressure discharge lamp according to claim 5, further comprising gradually increasing or gradually decreasing at least one of the current values before and after the polarity inversion for the short period current to form a ramp wave.

7. The method of lighting up a high pressure discharge lamp according to claim 5, wherein the current value of the short period current is set to 1.2 times or more and 5 times or less the current value of the standard period current.

8. The method of lighting up a high pressure discharge lamp according to claim 5, further comprising:
   setting the predetermined standard period of the standard period current to $\frac{1}{500}$ sec or more and $\frac{1}{60}$ sec or less and
   setting the period of the short period current to $\frac{1}{30}$ times or more and $\frac{1}{4}$ times or less the predetermined standard period.

* * * * *